United States Patent
Li et al.

(10) Patent No.: US 11,247,655 B2
(45) Date of Patent: Feb. 15, 2022

(54) HYBRID PROPULSION SYSTEM

(71) Applicant: GM GLOBAL TECHNOLOGY OPERATIONS LLC, Detroit, MI (US)

(72) Inventors: Dongxu Li, Troy, MI (US); Chunhao J. Lee, Troy, MI (US); Neeraj S. Shidore, Novi, MI (US); Luke D. Shepley, Berkley, MI (US); Brenton J. Bergkoetter, Milford, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 16/508,823

(22) Filed: Jul. 11, 2019

(65) Prior Publication Data
US 2021/0009104 A1   Jan. 14, 2021

(51) Int. Cl.
*B60W 10/30* (2006.01)
*B60W 10/02* (2006.01)

(52) U.S. Cl.
CPC .......... *B60W 10/30* (2013.01); *B60W 10/023* (2013.01); *B60W 10/026* (2013.01); *B60W 2710/024* (2013.01)

(58) Field of Classification Search
CPC .. B60W 10/30; B60W 10/023; B60W 10/026; B60W 2710/024; B60W 2710/083; B60W 2540/10; B60W 2540/12; B60W 30/18027; B60W 30/18109; B60W 30/18054; B60K 6/40; B60K 2006/4833; B60K 2006/4825; B60K 6/485

USPC .......................................................... 701/36
See application file for complete search history.

(56) References Cited

U.S. PATENT DOCUMENTS

| | | | | |
|---|---|---|---|---|
| 2003/0089538 | A1* | 5/2003 | Boggs | B60W 10/06 180/65.235 |
| 2006/0224282 | A1* | 10/2006 | Seo | B60K 6/365 701/22 |
| 2007/0093341 | A1* | 4/2007 | Supina | B60K 6/445 475/5 |
| 2012/0109432 | A1* | 5/2012 | Pitsch | B60K 6/48 701/22 |

(Continued)

FOREIGN PATENT DOCUMENTS

DE      102012224214 A1 *  6/2014 ......... F16H 61/0031

*Primary Examiner* — Jonathan M Dager
*Assistant Examiner* — Jean W Charleston
(74) *Attorney, Agent, or Firm* — Quinn IP Law

(57) ABSTRACT

A hybrid powertrain system includes an electric machine, a torque converter, a transmission, a hydraulic pump, and a controller, and it is arranged to transfer mechanical power to a driveline. The torque converter includes a clutch, a pump, and a turbine, and the electric machine is rotatably coupled to the hydraulic pump and to the torque converter pump. The hydraulic pump is fluidly connected to the transmission, and the controller is operably connected to the electric machine and the torque converter clutch. The controller is executable to determine an operator command, and control the electric machine to spin the hydraulic pump in a speed control mode and control the torque converter clutch in an open state. Upon achieving a desired minimum pump speed, the torque converter clutch is applied in a slip state and the electric machine is controlled in response to the operator command.

19 Claims, 2 Drawing Sheets

(56) References Cited

U.S. PATENT DOCUMENTS

| | | | |
|---|---|---|---|
| 2012/0296536 A1* | 11/2012 | Lee | F16H 61/143 |
| | | | 701/54 |
| 2013/0345010 A1* | 12/2013 | Kaltenbach | F16H 37/065 |
| | | | 475/5 |
| 2018/0050685 A1* | 2/2018 | Atluri | B60K 6/40 |
| 2018/0050686 A1* | 2/2018 | Atluri | B60W 20/40 |
| 2018/0236866 A1* | 8/2018 | Paterno | B60K 6/52 |

* cited by examiner

HYBRID PROPULSION SYSTEM

INTRODUCTION

Vehicles employing hybrid powertrain systems for propulsion may include an internal combustion engine and an electric machine that transfer torque to a driveline via a transmission. Transmissions employ pressurized hydraulic fluid to activate clutches to effect torque transfer at different speed ranges, wherein the pressurized hydraulic fluid is supplied via a hydraulic pump. Known systems may employ an electrically-driven hydraulic pump to supply pressurized hydraulic fluid for transmission operation when the engine is in an off state, i.e., not rotating, such as during an autostop event that may be commanded at an intersection. An electrically-driven hydraulic pump is able to supply pressurized hydraulic fluid during a subsequent vehicle launch event. In the absence of pressurized hydraulic fluid to the transmission being delivered by an electrically-driven hydraulic pump, a launch may be delayed while awaiting an increase in the hydraulic pressure, which may be generated by engine start and associated spinning of a torque converter pump element. However, an electrically-driven hydraulic pump adds electrical and control complexity to the system, increases costs, consumes energy, and requires packaging space in an underhood environment.

SUMMARY

The concepts described herein provide a creative arrangement of a hybrid powertrain for a vehicle and associated methods for control thereof. The hybrid powertrain system includes an electric machine, a torque converter, a transmission, a hydraulic pump, and a controller, and it is arranged to transfer mechanical power to a driveline. The torque converter includes a clutch, a pump, and a turbine, and the electric machine is rotatably coupled to the hydraulic pump and to the torque converter pump. The hydraulic pump is fluidly connected to the transmission, and the controller is operably connected to the electric machine and the torque converter clutch. The controller includes an instruction set that is executable to determine an operator command, and control the electric machine to spin the hydraulic pump in a speed control mode and control the torque converter clutch in an open state. Upon achieving a desired minimum pump speed, the torque converter clutch is applied in a slip state and the electric machine is controlled in response to the operator command.

An aspect of the disclosure includes an internal combustion engine, wherein the internal combustion engine is selectively couplable to the torque converter pump via an intervening disconnect clutch, and wherein the internal combustion engine is decoupled from the torque converter pump.

Another aspect of the disclosure includes the instruction set being executable to detect an operator command to launch the vehicle.

Another aspect of the disclosure includes the instruction set being executable to determine an operator command for braking the vehicle.

Another aspect of the disclosure includes the instruction set being executable to determine an operator command for idling the vehicle.

Another aspect of the disclosure includes the desired minimum pump speed being a minimum pump speed that is associated with a desired transmission pressure.

Another aspect of the disclosure includes the instruction set being executable to control the electric machine to generate torque in response to the operator command.

Another aspect of the disclosure includes the instruction set being executable to control the torque converter clutch to decrease magnitude of clutch slip, and lock the torque converter clutch.

Another aspect of the disclosure includes the hydraulic pump being a mechanically-driven hydraulic pump, wherein the electric machine is rotatably coupled to the mechanically-driven hydraulic pump.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity, directional terms may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
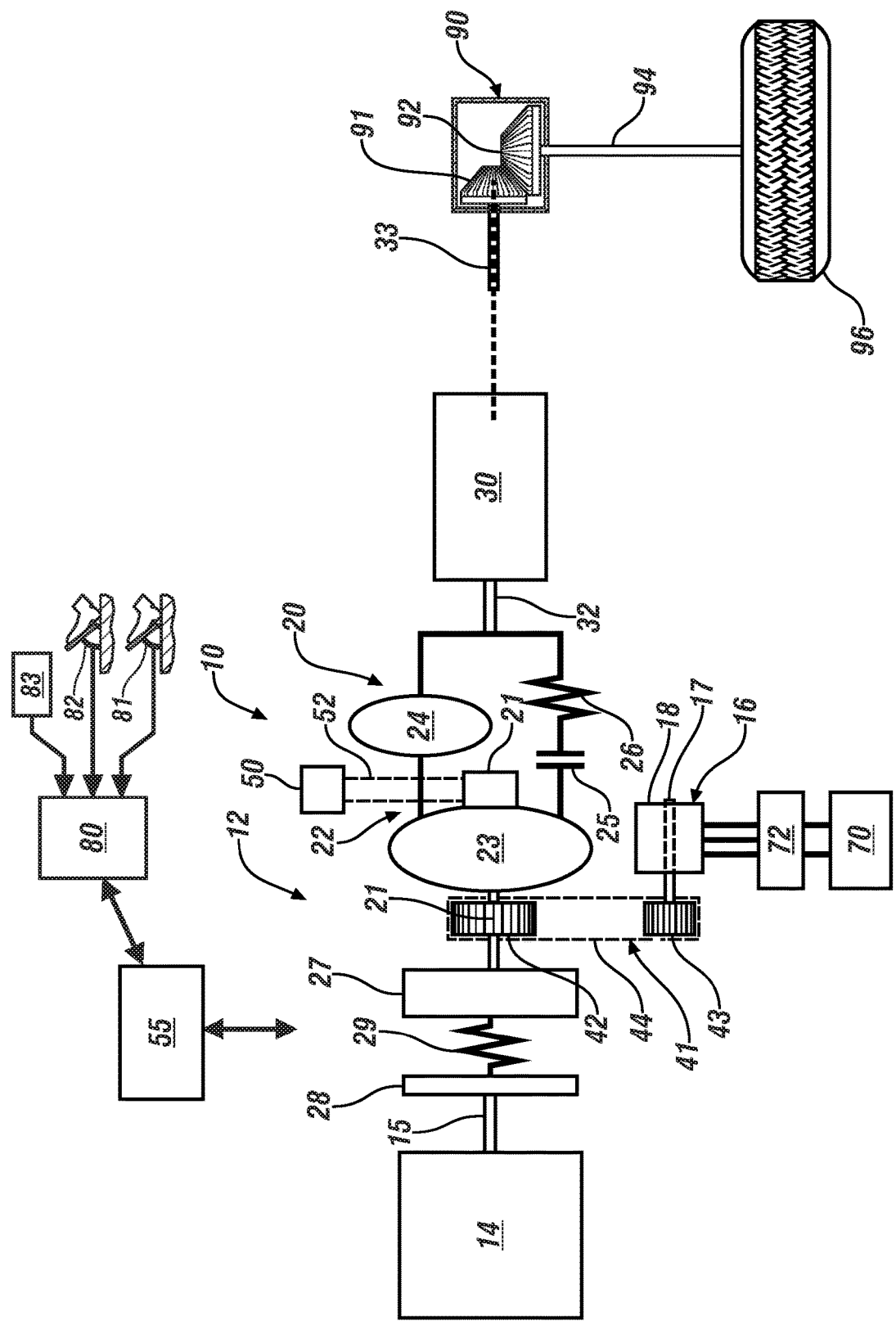
FIG. 1 schematically shows an embodiment of a hybrid powertrain system for a vehicle that arranged to transfer mechanical power between an internal combustion engine, an electric machine and a transmission, in accordance with the disclosure.

Referring to the drawings, wherein like reference numerals correspond to like or similar components throughout the several Figures, FIG. 1 schematically illustrates an embodiment of a drivetrain for a hybrid powertrain system 12 including an internal combustion engine (engine) 14, an electric machine 16, a transmission 30, and a driveline 90. The electric machine 16 is arranged to transfer torque to an input member 32 of the transmission 30 via an intervening torque converter 22. The transmission 30 includes an output member 33 that is coupled to the driveline 90 to transfer mechanical power to one or multiple drive wheel(s) 96 on a vehicle 10. The hybrid powertrain system 12 described here may be referred to as a P2 hybrid configuration, which describes an arrangement of elements wherein an electric machine is arranged to introduce torque into a drivetrain between an internal combustion engine and a transmission. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Operations of the engine 14, electric machine 16, and transmission 30 are controlled by a controller 55, which may be composed of a single one or a plurality of controllers that are arranged to monitor inputs from sensors and execute algorithms to control actuators in response to operator commands. Propulsion power for operating the vehicle 10 may be generated solely by the engine 14, solely by the electric machine 16, or by both the engine 14 and the electric machine 16.

The electric machine 16 includes a rotor 17 and a stator 18, and is arranged to transfer mechanical power between the rotor 17 and a mechanical drive mechanism 41. The mechanical drive mechanism 41 includes a first rotating member 42 that is rotatably linked to a second rotating member 43 via a mechanical linkage 44 to transfer torque. The first rotating member 42 is attached to a hub 21 of a torque converter pump 23, and the second rotating member 43 is coupled to the rotor 17.

The engine 14 is preferably configured as a multi-cylinder internal combustion engine that converts fuel to mechanical torque through a thermodynamic combustion process. The engine 14 is equipped with a plurality of actuators and sensing devices for monitoring operation and delivering fuel to form in-cylinder combustion charges that generate an expansion force onto pistons, with such force transferred to the crankshaft 15 to produce torque. The engine 14 includes a crankshaft 15 that is coupled to the torque converter pump 23 via an intervening flexplate 28, damper 29 and disconnect clutch 27. The engine 14 is controllable to execute autostop and autostart routines. The autostop routine includes controlling the engine 14 to an OFF state during vehicle operation, wherein the engine 14 is not spinning. The autostart routine includes controlling the engine 14 to an ON state, subsequent to execution of the autostop routine. The disconnect clutch 27 selectively couples the engine 14 to the torque converter pump 23 of the torque converter 22 in one embodiment. In one embodiment, the disconnect clutch 27 is a selectable mechanical diode, such as a one-way clutch or a selectable one-way clutch. The disconnect clutch 27 is open, i.e., deactivated when the engine 14 is controlled to the OFF state as part of executing the autostop routine.

The torque converter 22 is a rotatable torque coupling device arranged between the engine 14 and the input member 32 of the transmission 30. The torque converter 22 preferably includes the torque converter pump 23 rotatably coupled to the crankshaft 15, a stator element 26, a turbine 24 that is rotatably coupled to the input member 32 to the transmission 30 and a torque converter clutch 25. As previously indicated, the torque converter pump 23 includes the pump hub 21 that couples to the first rotating member 42 of the mechanical drive mechanism 41. The torque converter 22 is operable in one of a deactivated state, a slip state, or a locked state by selective activation of the torque converter clutch 25. The torque converter 22 operates to provide fluid torque coupling between the torque converter pump 23 and the turbine 24 when the torque converter clutch 25 is deactivated, and provides mechanical torque coupling between the torque converter pump 23 and the turbine 24 when the torque converter clutch 25 is activated in either the slip state or the locked state. The turbine 24 couples to the input member 32 of the transmission 30, with the torque converter clutch 25 and damper 29 being arranged in parallel to manage torque transfer thereto. In this embodiment, the torque converter pump 23 of the torque converter 22 includes the pump hub 21, and the first rotating member 42 of the mechanical drive mechanism 41 is attached to the pump hub 21 and rotates therewith. A portion of the pump hub 21 is also rotatably coupled to a mechanically-driven hydraulic pump (hydraulic pump) 50 that is fluidly coupled to the transmission 30 to circulate transmission fluid thereto.

The hydraulic pump 50 is a gerotor device, or another pump impeller arrangement, and is disposed between the disconnect clutch 27 and the torque converter 22. The hydraulic pump 50 is rotatably connected to the torque converter pump 23 of the torque converter 22 via a mechanical drive system 52, which may be in the form of meshed gears, belt drive, etc., thus eliminating the need for a second, electrical pump to provide pressurized hydraulic fluid to the transmission 30 when controlled as described with reference to FIG. 2.

The electric machine 16 is arranged, in one embodiment, as a multi-phase electric motor/generator that is configured to convert stored electric energy to mechanical power and convert mechanical power to electric energy that may be stored in a DC power source 70. The DC power source 70 may be configured at a nominal 48-volt DC voltage level in one embodiment. Alternatively, the DC power source 70 may be configured at a nominal 300 volt DC voltage level, or another voltage level, as may be selected. The electric machine 16 electrically connects via an inverter module 72 to the DC power source 70. Alternatively, another non-combustion torque machine, such as a pneumatically-powered device or a hydraulically-powered device may be employed in place of the electric machine 16. By way of definition, a non-combustion torque machine is a device that is capable of generating torque by converting a potential energy source to kinetic energy without combustion of the potential energy. Non-limiting examples of the potential energy source may include electric energy, pneumatic energy and hydraulic energy.

The transmission 30 includes one or a plurality of meshed gears, geartrains, clutches, pulleys, chain drives, etc. (not shown) that are disposed in a case and arranged to provide speed and/or torque conversion between the engine 14, the electric machine 16 and the driveline 90. Activation and deactivation of the clutches are accomplished by selectively controlling hydraulic pressure via valves and other fluidic control devices (not shown). The hydraulic pump 50 is arranged to supply the pressurized hydraulic fluid to the transmission 30 to effect activation and deactivation of the clutches and operate the torque converter 22. The transmission 30 may be arranged in a step-gear configuration in one embodiment, and may include one or more differential gearsets and activatable clutches configured to effect torque transfer in one of a plurality of fixed gear states over a range of speed ratios between the engine 14, the input member 32 and the output member 33. Alternatively, the transmission 30 may be configured as a manual transmission, a continuously-variable transmission (CVT), a dual-clutch transmission (DCT), or another arrangement. The output member 33 of the transmission 30 is rotatably coupled to an input member 91 of the differential gearset 92 either directly, or via a chain drive mechanism, a meshed gearset, or another torque transmission configuration.

In one embodiment a transfer case (not shown) may be rotatably coupled to the output member 33 of the transmission 30, and also rotatably coupled to the input member 91 of the differential gearset 92. The transfer case includes a gearing arrangement that couples to a second drive shaft (not shown) to transfer mechanical power from the transmission 30 to a second on-vehicle device, such as to a second differential to effect 4WD (four wheel drive) operation, or to a PTO (power take-off) arrangement to power an auxiliary device such as an electrical generator.

The driveline 90 is disposed to transfer propulsion power between the transmission 30 and the drive wheel(s) 96 via an axle 94, which is coupled to the differential gearset 92. The driveline 90 may be disposed in either a front-wheel drive configuration, a rear-wheel drive configuration (as shown), an all-wheel drive configuration, or a four-wheel drive configuration. The driveline 90 is configured to transfer tractive power between the output member 33 of the transmission 30, the electric machine 16 and a road surface via the drive wheel(s) 96. The driveline 90 is illustrative, and the concepts described herein apply to other drivetrain systems that are similarly configured.

The inverter module 72 is preferably configured with an MGU controller and control circuits including power transistors, e.g., integrated gate bipolar transistors (IGBTs) for transforming DC electric power to AC electric power and transforming AC electric power to DC electric power. The inverter module 72 may employ pulsewidth-modulating (PWM) control of the IGBTs to convert stored DC electric power originating in the DC power source 70 to AC electric power to drive the electric machine 16 to generate torque, which may be employed as propulsion torque. Similarly, the inverter module 72 converts mechanical power transferred to the electric machine 16 to DC electric power to generate electric energy that is storable in the DC power source 70, including as part of a regenerative braking control strategy. The MGU controller of the inverter module 72 receives motor control commands from the controller 55 and controls inverter states to provide a desired motor drive operation or a regenerative braking operation. In one embodiment, an auxiliary DC/DC electric power converter electrically connects via a high-voltage bus to the DC power source 70, and provides electric power to charge the low-voltage battery via a low-voltage bus. The low-voltage battery provides low-voltage electric power to low-voltage systems on the vehicle, including, e.g., a starter, electric windows, HVAC fans, seats, and other devices. In one embodiment the low-voltage battery is configured to operate at a nominal 12 VDC voltage level. The DC power source 70 is preferably disposed to supply electric power at a desired voltage level, and may be one of multiple embodiments of a DC power source, e.g., a multi-cell lithium ion device, an ultra-capacitor, or another device without limitation. Monitored parameters related to the DC power source 70 preferably include a state of charge (SOC), temperature, and others. In one embodiment, the DC power source 70 may electrically connect via an on-vehicle battery charger to a remote, off-vehicle electric power source for charging while the vehicle is stationary.

The controller 55 may signally connect to an operator interface (not shown), and operates to provide hierarchical control of a plurality of control devices to effect operational control of individual elements, including, e.g., the inverter module 72, the engine 14 and the transmission 30. The controller 55 communicates with each of the inverter module 72, the engine 14 and the transmission 30, either directly or via a communication bus to monitor operation and control operations thereof.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another communication link. Communications includes exchanging data signals, including, for example, electrical signals via a conductive medium, electromagnetic signals via air, optical signals via optical waveguides, and the like. Data signals may include signals representing inputs from sensors, signals representing actuator commands, and communications signals between controllers.

An operator may command operation of the vehicle 10 via a plurality of human/machine interface devices. The human/machine interface devices include, e.g., an accelerator pedal 81, a brake pedal 82 and a transmission range selector (PRNDL) 83, which may communicate with the controller 55 via a second controller 80. Other human/machine interface devices may include an ignition switch to enable an operator to crank and start the engine 14, a cruise control actuator and an adaptive cruise control actuator. Operator commands include output torque requests in the form of an acceleration command and a braking command. The accelerator pedal 81 provides signal input indicating an accelerator pedal position and the brake pedal 82 provides signal input indicating a brake pedal position, both of which are monitored to determine the output torque request. The transmission range selector 83 provides signal input indicating direction of operator-intended motion of the vehicle including a discrete number of operator-selectable positions indicating the desired rotational direction of the output member 33 of the transmission 30 in either a forward or a reverse direction. The accelerator pedal 81, brake pedal 82, transmission range selector (PRNDL) 83, and the cruise control system are employed to generate the output torque request, which is used to command operation of the powertrain system 20 and the vehicle braking system to effect vehicle acceleration and deceleration.

Figure 2:
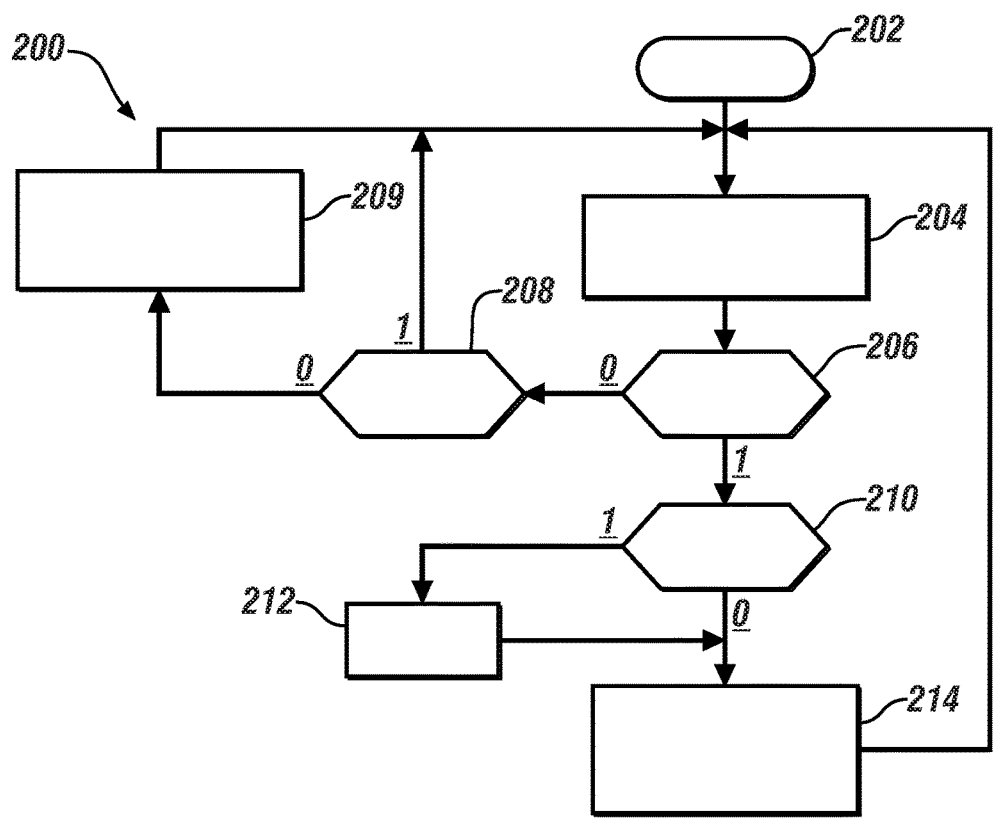
FIG. 2 schematically shows a control routine, in the form of a flowchart, for controlling operation of an embodiment of the hybrid powertrain system described with reference to FIG. 1, in accordance with the disclosure.

Referring now to FIG. 2, with continued reference to the vehicle 10 of FIG. 1, a control routine 200 that may be executed in the controller 55 to control operation of an embodiment of the powertrain system 12 in response to an output torque request. In one embodiment, the output torque request may be in the form of a command to launch the vehicle 10 from a stopped state, such as from a stop light or stop sign. In one embodiment, the output torque request may be executed with the engine 14 in an autostop state and with the disconnect clutch 27 being in an open or deactivated state. As such, during execution of the control routine 200, the powertrain system 20 may be operating in an electric vehicle state, wherein the propulsion torque is generated by the electric machine 16, and the disconnect clutch 27 is in the open state. The control routine 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

Execution of the control routine 200 may proceed as follows. The steps of the control routine 200 may be executed in order, but are not limited to the order described with reference to FIG. 2. As employed herein, the term "1" indicates an answer in the affirmative, or "YES", and the term "0" indicates an answer in the negative, or "NO". The control routine 200 executes as part of an overall control strategy to control operation of the powertrain system 12, under conditions that include the vehicle 10 operating with the engine 14 being in an autostop state, and with the disconnect clutch 27 being in the open state. In one embodiment, the vehicle speed is zero. In this state, hydraulic pressure in the transmission 30 may be less than necessary to activate the torque-transfer elements of the transmission 30, e.g., the clutches.

Overall, the control routine 200 initially operates the electric machine 16 in a speed control mode in response to an operator command, which includes controlling the electric machine 16 to operate the hydraulic pump 50 to rapidly increase hydraulic pressure in the transmission 30 to achieve sufficient hydraulic pressure and flow to fill and activate the clutches in the transmission 30 and operate the torque converter 22. When the hydraulic pressure in the transmission 30 is greater than a minimum desired transmission pressure, the control routine 200 transitions to operating the electric machine 16 in a torque control mode, which includes controlling the electric machine 16 to operate the hydraulic pump 50 in response to the output torque request. In the torque control mode, the torque converter clutch 25 is employed as a controllable torque decoupling element to regulate the torque transfer and input speed to the transmission 30.

The control routine 200 is initiated when the vehicle operator generates an output torque request in the form of a command for propulsion power, such as to execute a vehicle launch, by depressing the accelerator pedal 81 (202). Alternatively, the control routine 200 operates under a condition of engine braking, which may be coupled with regenerative braking by the electric machine 16, wherein the engine 14 may be employed to introduce inertia into the powertrain system. As such, the command for propulsion power may be a positive command, i.e., for acceleration, or a negative command, i.e., for deceleration. A hydraulic power output from the pump 50, including a desired transmission pressure (Pr) and a desired flow (F) for responding to the operator command for propulsion power, is determined. A minimum desired pump speed V'p for the pump 50 is determined in response to the desired transmission pressure (Pr) and desired flow (F) (204).

The minimum desired pump speed V'p is compared to an actual pump speed V_p (206), which may be directly measured or inferred.

When the minimum desired pump speed V'p is greater than the actual pump speed V_p (206)(1), the routine determines whether the torque converter clutch 25 is locked (208), and if so (208)(1), continues operation to increase the actual pump speed V_p (204). When the torque converter clutch 25 is unlocked (208)(0), the routine 200 coordinates control of the torque converter clutch 25 and the torque output of the electric machine 16. This includes controlling torque output of the electric machine 16 in response to the output torque request to control the actual pump speed V_p and coincidently regulating the torque converter clutch 25 in response to the output torque request, which may include an operator torque request or a regenerative torque demand at an appropriate magnitude of slip by the torque converter clutch 25 (209). In so doing, the control routine 200 may work towards activating the torque converter clutch 25. As such, torque output of the electric machine 16 is controlled during a vehicle launch to provide hydraulic pressure to the transmission 30. Furthermore, the torque output of the electric machine 16 is controlled when the vehicle is at a standstill to rotate the main turbine pump of the transmission to maintain clutch pressure in a low transmission gear. Furthermore, the torque output of the electric machine 16 is controlled during vehicle deceleration to maintain at least a minimum hydraulic pressure to the transmission 30 to effect regenerative braking operation with the torque converter clutch 25 in a locked state. Furthermore, the torque output of the electric machine 16 is controlled to maintain transmission clutch pressure during operation in first gear, such as in a creep mode or idle mode during marshalling and during slow traffic conditions.

When the minimum desired pump speed V'p is greater than the actual pump speed V_p (206)(0), the control routine 200 determines whether the torque converter clutch 25 is locked (210). When the torque converter clutch 25 is locked (210)(1), the torque converter clutch 25 may be allowed to slip, wherein the magnitude of slip S may be determined based upon a difference between the minimum desired pump speed V'p and the actual pump speed V_p (212).

When the torque converter clutch 25 is unlocked (210)(0), the control routine 200 coordinates control of the torque converter clutch 25 and the torque output of the electric machine 16 (214). This includes controlling torque output of the electric machine 16 in response to the output torque request to increase the actual pump speed V_p to achieve the minimum desired pump speed V'p, and coincidently regulating the torque converter clutch 25 in response to the output torque request and the magnitude of slip S of the torque converter clutch 25.

In this manner, the control routine 200 controls the electric machine 16 to simultaneously operate the hydraulic pump 50 to generate hydraulic pressure and also operate the torque converter clutch 25 to control torque transfer to the transmission 30 and driveline 90 in response to the output torque request, while minimizing any time lag that may otherwise have been caused by low hydraulic pressure in the transmission 30.

Figure 3:
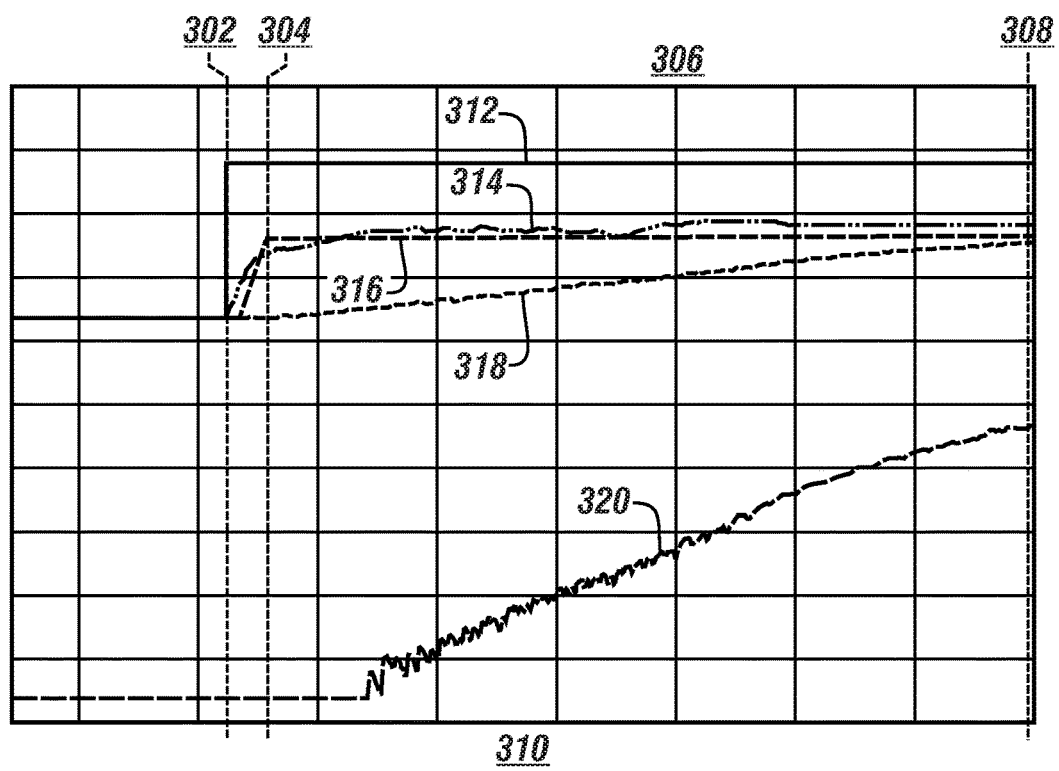
FIG. 3 graphically shows data associated with operation of an embodiment of the hybrid powertrain system of FIG. 1, employing an embodiment of the control routine described with reference to FIG. 2, in accordance with the disclosure.

FIG. 3 graphically shows execution of the control routine 200 on an embodiment of the vehicle 10 during a vehicle launch event, in relation to time, which is shown on the horizontal axis 310. Plotted parameters include operator input to the accelerator pedal 81 (312), rotational speed of the electric machine 16 (314), transmission hydraulic pressure (316), rotational speed of the turbine 24 of the torque converter 22 (318), and vehicle speed (320). In the illustrated operation, the control routine 200 initiates in response to a tip-in event, which is indicated by an increase in the operator input to the accelerator pedal 81 (312), which is shown as a step input. At this first stage 302, the torque converter clutch 25 is commanded to an open state, and the rotational speed of the electric machine 16 (314) increases, with an associated increase in the transmission hydraulic pressure (316).

A second stage 304 initiates when the rotational speed of the turbine 24 of the torque converter 22 (318) achieves the minimum desired pump speed V'p, which leads to the control routine 200 transitioning to operating in the torque control mode in response to the operator input to the accelerator pedal 81 (312).

A third stage 306 initiates to begin to apply the torque converter clutch 25 and regulate clutch pressure to reduce slip of the torque converter clutch 25, leading towards synchronizing elements for locking of the torque converter clutch 25, which initiates operation in the fourth stage 308. As appreciated by skilled practitioners, the execution of the control routine 200 on an embodiment of the vehicle 10 also includes vehicle operation during regenerative braking and during vehicle idling at or near a standstill condition to control and maintain clutch pressure for operating the transmission 30 on an embodiment of the vehicle 10 that is described herein.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A hybrid powertrain system for a vehicle, comprising:
   an electric machine, a torque converter, a transmission, a hydraulic pump, and a controller;
   wherein the torque converter includes a clutch, a pump, and a turbine;
   wherein the electric machine is rotatably coupled to the hydraulic pump and to the torque converter pump;
   wherein the hydraulic pump is fluidly connected to the transmission;
   wherein the controller is operably connected to the electric machine and the torque converter clutch;
   wherein the controller includes an instruction set, the instruction set executable to:
   determine an operator command;
   control the electric machine to spin the hydraulic pump in a speed control mode to achieve a desired minimum pump speed, and control the torque converter clutch in an open state; and
   upon achieving the desired minimum pump speed, apply the torque converter clutch in a slip state and control the electric machine in response to the operator command.

2. The hybrid powertrain system of claim 1, further comprising an internal combustion engine, wherein the internal combustion engine is selectively couplable to the torque converter pump via an intervening disconnect device.

3. The hybrid powertrain system of claim 1, wherein the instruction set executable to determine the operator command comprises the instruction set executable to determine an operator command to launch the vehicle.

4. The hybrid powertrain system of claim 1, wherein the instruction set executable to determine the operator command comprises the instruction set executable to determine an operator command for braking the vehicle.

5. The hybrid powertrain system of claim 1, wherein the instruction set executable to determine the operator command comprises the instruction set executable to determine an operator command for idling the vehicle.

6. The hybrid powertrain system of claim 1, wherein the instruction set executable to control the electric machine in response to the operator command comprises the instruction set executable to control the electric machine to generate torque in response to the operator command.

7. The hybrid powertrain system of claim 1, wherein the desired minimum pump speed comprises a minimum pump speed associated with a desired hydraulic pressure and a desired hydraulic flow.

8. The hybrid powertrain system of claim 1, further comprising the instruction set executable to:
   control the torque converter clutch to regulate magnitude of clutch slip; and
   lock the torque converter clutch.

9. The hybrid powertrain system of claim 1, wherein the hydraulic pump comprises a mechanically-driven hydraulic pump, wherein the electric machine is rotatably coupled to the mechanically-driven hydraulic pump.

10. A method for controlling a hybrid powertrain system for a vehicle, the method comprising:
    arranging the hybrid powertrain to include an electric machine, a torque converter, a transmission, a hydraulic pump, and an internal combustion engine, wherein the torque converter includes a clutch, a pump, and a turbine, wherein the electric machine is rotatably coupled to the hydraulic pump and to the torque converter pump, wherein the hydraulic pump is fluidly connected to the transmission, and wherein the controller is operably connected to the electric machine and the torque converter clutch;

determining an operator command;

controlling the electric machine to spin the hydraulic pump in a speed control mode to achieve a desired minimum pump speed, and controlling the torque converter clutch in an open state; and applying the torque converter clutch in a slip state and control the electric machine in response to the operator command upon achieving the desired minimum pump speed.

11. The method of claim 10, further comprising wherein the internal combustion engine is selectively couplable to the torque converter pump via an intervening disconnect device.

12. The method of claim 10, wherein determining the operator command comprises determining an operator command to launch the vehicle.

13. The method of claim 10, wherein determining the operator command comprises determining an operator command for braking the vehicle.

14. The method of claim 10, wherein determining the operator command comprises determining an operator command for idling the vehicle.

15. The method of claim 10, controlling the electric machine in response to the operator command controlling the electric machine to generate torque in response to the operator command.

16. The method of claim 10, wherein the desired minimum pump speed comprises a minimum pump speed associated with a desired hydraulic pressure and a desired hydraulic flow.

17. The method of claim 10, further comprising:

controlling the torque converter clutch to regulate magnitude of clutch slip; and locking the torque converter clutch.

18. A hybrid powertrain system for a vehicle, comprising:

an electric machine, a torque converter, a transmission, a hydraulic pump, an internal combustion engine, and a controller;

wherein the torque converter includes a clutch, a pump, and a turbine;

wherein the internal combustion engine is selectively couplable to the torque converter pump via an intervening disconnect clutch;

wherein the internal combustion engine is decoupled from the torque converter pump;

wherein the electric machine is rotatably coupled to the hydraulic pump and to the torque converter pump;

wherein the hydraulic pump is fluidly connected to the transmission;

wherein the controller is operably connected to the electric machine and the torque converter clutch;

wherein the controller includes an instruction set, the instruction set executable to:

determine an operator command;

control the electric machine to spin the hydraulic pump in a speed control mode to achieve a desired minimum pump speed;

control the torque converter clutch in an open state; and upon achieving the desired minimum pump speed, apply the torque converter clutch in a slip state and control the electric machine in response to the operator command, including:

control the torque converter clutch to regulate magnitude of clutch slip, and lock the torque converter clutch.

19. The hybrid powertrain system of claim 18, wherein the desired minimum pump speed comprises a minimum pump speed associated with a desired hydraulic pressure and a desired hydraulic flow.

* * * * *